United States Patent [19]

Black

[11] Patent Number: 4,864,274
[45] Date of Patent: Sep. 5, 1989

[54] REMOTE READING THERMOSTAT

[75] Inventor: William C. Black, Mound, Minn.

[73] Assignee: Northern Microdesign Inc., Minneapolis, Minn.

[21] Appl. No.: 261,912

[22] Filed: Oct. 24, 1988

[51] Int. Cl.⁴ .................................... H04M 11/04
[52] U.S. Cl. .................... 340/310 R; 340/310 A; 340/501; 340/870.02; 340/825.55; 236/1 B
[58] Field of Search .......... 340/310 R, 310 A, 501, 340/825.54, 825.55, 870.02, 870.12, 870.13, 870.17; 236/1 B, 91 C, 91 D, 91 E, 91 F, 91 G

[56] References Cited

U.S. PATENT DOCUMENTS

| | | | |
|---|---|---|---|
| 3,614,318 | 10/1971 | Klose | 178/68 |
| 3,922,492 | 11/1975 | Lumsden | 179/2 |
| 4,363,121 | 12/1982 | Schlyter | 370/24 |
| 4,520,488 | 5/1985 | Houvig | 375/5 |
| 4,540,890 | 9/1985 | Gangemi et al. | 340/310 R |
| 4,607,247 | 8/1986 | Sterling, Jr. et al. | 340/310 |
| 4,737,657 | 4/1988 | Jatko et al. | 340/310 R |

*Primary Examiner*—Donnie L. Crosland
*Attorney, Agent, or Firm*—Kinney & Lange

[57] ABSTRACT

An information transmission system using a pair of transmission interconnections to supply power from a collection station to an operating station, and to transmit information back based on the collection station providing a changing voltage on the two interconnections and the operating station modulating the amount of current drawn about a reference current to represent information.

11 Claims, 6 Drawing Sheets

REMOTE READING THERMOSTAT

BACKGROUND OF THE INVENTION

The present invention relates to a system for transmitting signals between an operating station and a remote reading station and, more particularly, to a means for transmitting information relating to a thermostat located in a controlled environment to a remote information collection center.

Control of an environment for living or working to thereby maintain the comfort of people within is usually necessary if the space containing such an environment is to be successfully rented or leased for such use. However, the comfort range of various environment variables such as temperature, humidity, etc., differ for different people. As a result, environmental controllers, ones having adjustable set points from which a user can select to thereby command that a certain environmental parameter value be provided, such as a thermostat, will have different ones of the set points it offers selected by different users.

A further consequence is that users in one environment will, in choosing different set points than users in another environment, have different usages of energy or other resources than do the users in another. This means that users in some spaces will cause greater expenditures for resources than others in different spaces, yet each should bear a proportionate amount of such expenditures. Such an allocation cannot be made, however, in the absence of information concerning the amount of resources used in each space.

Obtaining such resource use information for each of different ones of separated spaces, such as separate apartments in an apartment building, requires some measurement being made of resource use in each such space. Yet the cost of performing such measurements should be low so as to avoid significantly raising the cost of use of such space. Thus, there is a desire for a low cost system for the measurement of resource use, primarily for the measure of temperature settings as an indication of heating or cooling energy use.

SUMMARY OF THE INVENTION

The present invention uses a pair of transmission interconnections to supply power from a collection station to an operator station, and to transmit information back. The collection station provides a voltage changing between values on these two interconnections to thereby also provide a time base. The operating station modulates the amount of current it draws over these interconnections with a digital code representing the information acquired for transmission at the operating station. Information relating to the setting of tee control of a thermostat indicating the user's desired temperature set point is acquired by using a special electrode configuration attached to that control that generates a digital output corresponding to the setting.

DETAILED DESCRIPTION OF THE PREFERRED EMBODIMENTS

Figure 1:
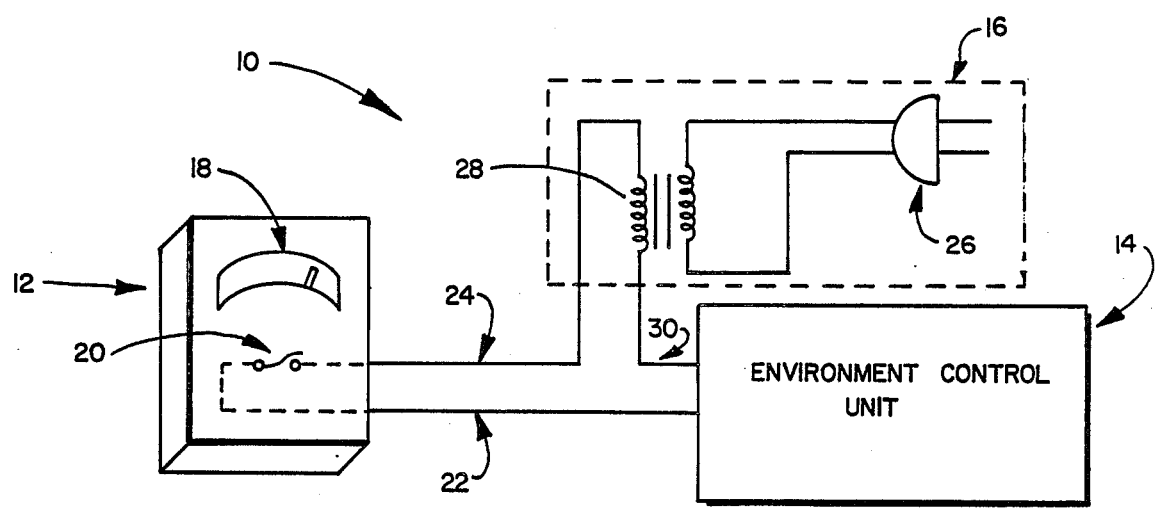
FIG. 1 shows an environmental control system for the heating or cooling apparatus of an environment.

The present invention is to be used with a typical environmental control system, 10, such as is schematically depicted in FIG. 1 for controlling the temperature of the environment in some substantially isolated space. Environmental control system 10 of FIG. 1 includes a thermostat, 12, a heating/cooling unit, 14, and a power supply access means, 16, adapted for electrical connection to a source of alternating polarity voltage. Thermostat 12 is included with a set point control arm and background dial combination, 18, and an internal switch, 20. Thermostat 12 is connected to heating/cooling unit 14 by an interconnection means, 22, typically an insulated wire. Power supply access means 16 includes an electrical outlet plug, 26, electrically connected across the primary of a transformer, 28. The secondary of transformer 28 is connected to thermostat 12 on one side thereof by an interconnection, 24, and to heating/cooling unit 14 on the other side thereof by an interconnection, 30.

Figure 2:
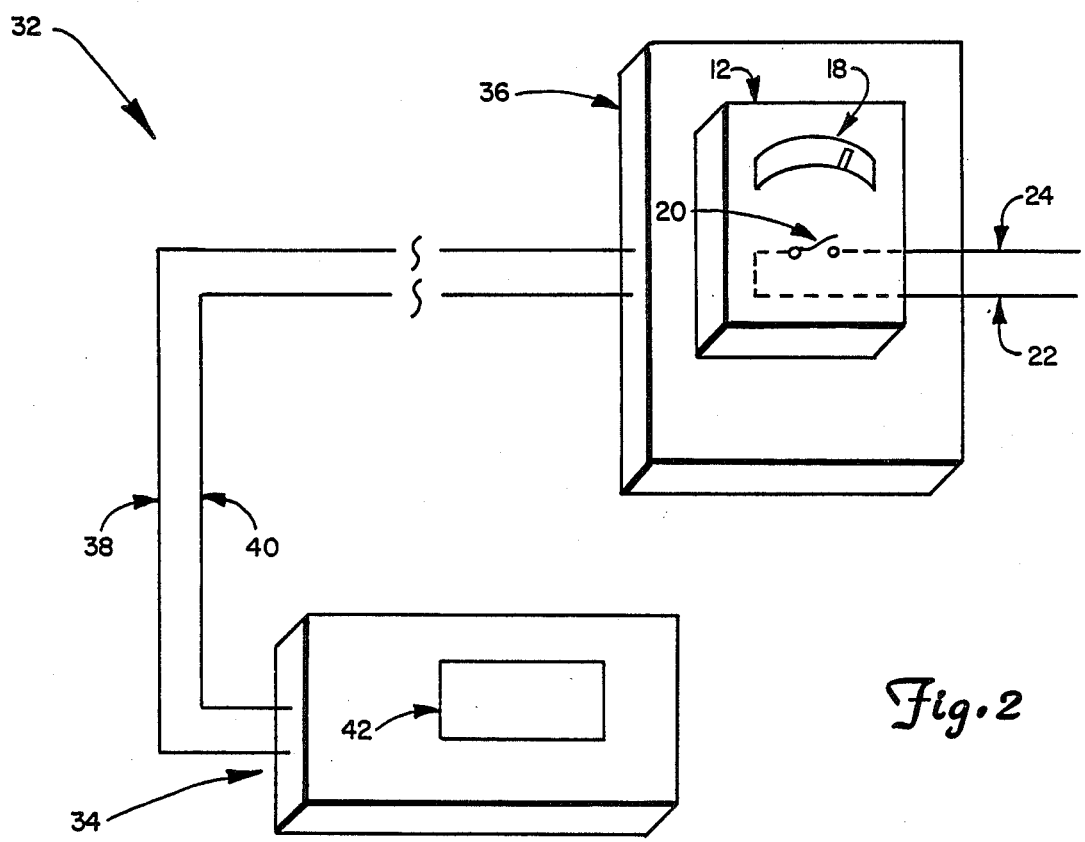
FIG. 2 shows an addition to a portion of FIG. 1 embodying part of the present invention.

In FIG. 2, thermostat 12 of FIG. 1 is shown in modified form with the provision of additional means to form a remote reading system shown generally as a system addition, 32. A remote reading station, 34, is electrically connected to a base unit, 36, forming an operating station with thermostat 12, by a pair of interconnections, 38 and 40, serving as information and power transmission lines and formed typically of insulated wire. Such transmission line interconnections could be specifically installed in the walls of the enclosure substantially enclosing the space, or they could be interconnections provided originally for some other purpose such as an extra pair of conductors in a telephone line.

Base unit 36 has mounted thereon thermostat 12 to form the operating station as will be described below. A display means, 42, is shown in remote reading station 34 to indicate the information obtained from base unit 36.

Figure 3:
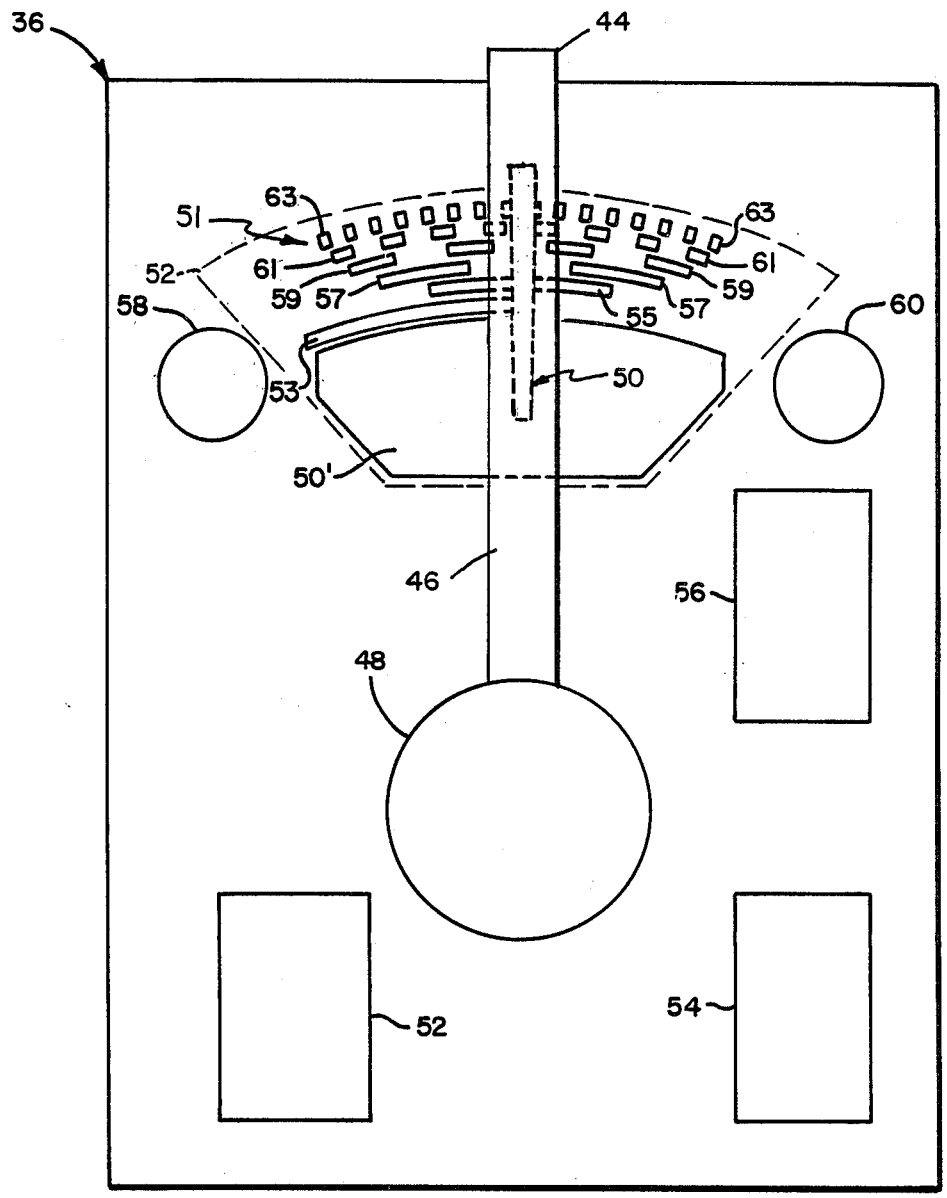
FIG. 3 shows a further portion of the present invention shown in FIG. 2.

Operating station base unit 36 is shown in FIG. 3 to include a pivotally mounted wiper armature, 44, mechanically connected to the set point control arm of combination 18 of thermostat 12. As a result, armature 44 moves directly with movement of this control arm in set point control arm and dial combination 18. Wiper armature 44 includes a wiper blade, 46, a wiper axle or pivot means, 48, and an electrical wiper contact, 50, mounted on wiper blade 46 as part of a Gray code position encoder.

Stationary electrical contact tracks, 51, on a circuit board in base unit 36 comprise a series of precisely positioned, circular sector-like track portions, 53, 55, 57, 59, 61 and 63, each representing one bit in a Gray code. Each such track portion contains one or more electrically conducting segments, or strips, deposited on the circuit board and one or more insulated segments or bare board portions, so that each track portion can represent a one or a zero depending on where it is contacted by contact 50 on wiper 46. Track 63 has the most segments with approximately equal spacing between each kind of segment, both the conductive and the insulative kinds. The conductive segments are slightly smaller- which is acceptable because of the width of wiper contact 50. Each succeeding track down to track 53 has half the segments of each kind in the previous track, but each is twice as long as those in the previous track. The segments in each track start in the middle of a conductive segment of a previous track. The smallest angular shift of a radius over the track portions that will result in a different pattern of conductive segments and insulative segments thereunder will be one-half the track length of a conductive or insulative segment in track 63.

A further contact, 50', extends for the entire length of travel of blade 46. Wiper contact 50 completes a circuit to ground between contact 50' and various combinations of the other contact strips 51 depending on the angular position of wiper blade 46. The six track portions 51 allow 26 or 64 different combinations of these track portions coming into contact with wiper contact 50 depending on its position, each track portion being at a positive voltage to thereby represent a one logic state on each, except for those connected to ground through wiper contact 50 which represent a zero logic state. If a typical temperature set point range of 50° F. to 90° F. is provided in thermostat 12 on the dial in combination 18, armature 44 and tracks 51 will permit providing a digital code output representing the thermostat set point to the nearest 0.6° F. approximately.

Base unit 36 further includes a data acquisition/conversion electronics module, 52, a control logic electronics module, 54, and a power conditioning/data transfer electronics module, 56. Interconnections 38 and 40 are connected to a pair of terminals, 58 and 60, also located in base unit 36.

Figure 4:
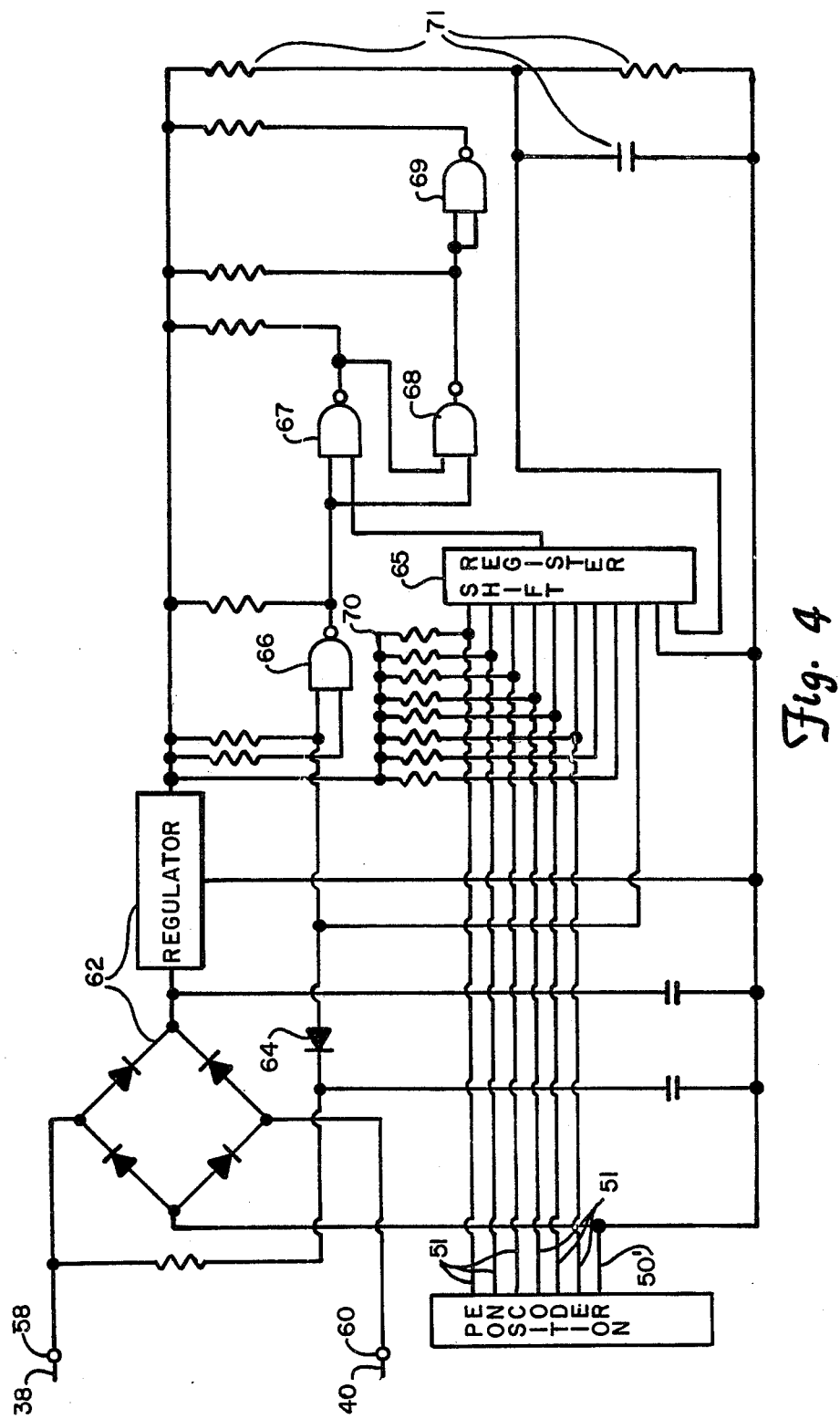
FIG. 4 shows a schematic diagram of a portion of the present invention in FIG. 2.

A schematic diagram of the electronics in modules 52, 54 and 56 of base unit 36 is shown in FIG. 4. A rectifier and voltage regulator arrangement, 62, has interconnections 38 and 40 connected thereto (through terminals 58 and 60), and provides a constant polarity voltage at the regulator output. A clock signal extraction circuit is provided by a diode, 64, which has alternating high and low voltage signals occurring at its anode for alternating high and low signals occurring on terminal 58 to which its cathode is connected. This connection occurs through this cathode being connected at the midpoint of a series resistor-capacitor circuit serving as a high frequency line filter with the resistor connected to terminal 58 and the capacitor connected to the low voltage terminal of the regulator in arrangement 62. The clock signal is applied to the clock input of a shift register, 65.

The clock signal at the anode of diode 64 also serves as a polarity detector for voltages between interconnections 38 and 40. A high voltage portion of the clock signal indicates that terminal 58 is positive with respect to terminal 60, and a low voltage portion of the clock signal indicates the opposite. This clocked polarity detection signal is applied to terminal input NAND logic gate, 66, of a set of logic gates which determine the current drain occurring primarily during each clock signal cycle. If the clock signal voltage state is high, the output of gate 66 will be low since its other input is connected to a high voltage state. The resistor at its output is large and draws little current, but one of the inputs of each of the two following NAND gates, 67 and 68, will be held low no matter what occurs on the other input of each so that the outputs of each will be high. The high output from gate 68 is applied to the inputs of the final NAND gate, 69, causing its output to be low. The relatively small resistance value resistor at the output of gate 69 draws a significant current, typically 20 mA.

If the clock signal voltage state is low, the output of gate 66 will be high and so will the inputs of gates 67 and 68 connected thereto. Now, however, the outputs of these gates will depend on the voltage state value occurring on the output of shift register 65 in that clock cycle. The output of shift register 65 depends in turn on the voltages occurring on tracks 51 from the encoder at times during which the voltage on the parallel information loading control terminal of shift register 65 is less than a threshold value. The voltages occurring on tracks 51 are determined by which of them is connected to the low voltage value output of rectifier and regulator arrangement 62 through track 50' by the wiper blade position occurring for a temperature setting. Corresponding ones of a set of resistors, 70, connected to the output of rectifier and regulator arrangement 62, are then grounded at opposite ends thereof where connected to the inputs of shift register 65.

This information can be seen in FIG. 4 to be supplied to the inputs of shift register 65 where the information for one track is shifted to the output thereof in each clock cycle. A high voltage state at the output of shift register 65, for the clock signal in a low voltage state so the inputs to gates 67 and 68 connected to the output of gate 66 are both high, will cause the output of gate 67 to be low. The small resistance value of the resistor at gate 67 output will draw a significant current. Gate 68 will be in a high logic state at its output and so the output of gate 69 will be low and again draw a significant current. Thus, two significant currents are drawn.

A low state at the output of shift register 65 for a low voltage state portion of the clock signal leads to the output of gate 67 being high and the output of gate 68 being low. As a result, the output of gate 69 is high and no significant currents are drawn at the outputs of the gates of FIG. 4.

A delayed signal for the parallel information loading control terminal at shift register 65 is supplied from a voltage divider and capacitive arrangement, 71, shown to the far right in FIG. 4. The voltage from the juncture of these components, when applied to the parallel information loading control terminal of shift register 65, causes the information on tracks 51 to be loaded into that shift register in parallel so long as its value remains below a threshold value. The delay in reaching this threshold allows the voltages representing logic states on tracks 51 to settle to the desired values after power has been supplied to operating station base unit 36.

Figure 6:
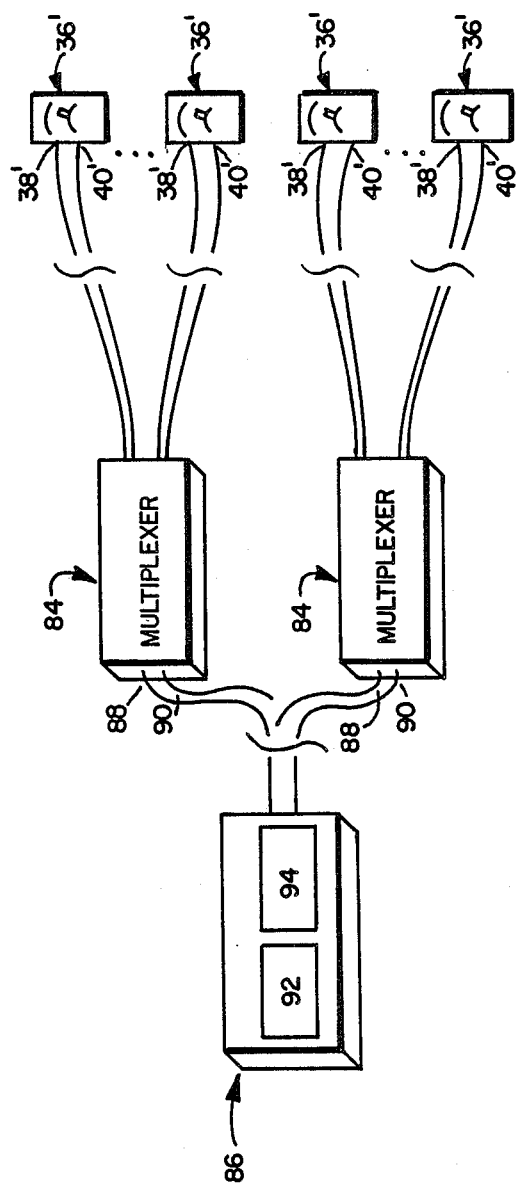
FIG. 6 shows an expansion of the present invention shown in FIG. 2.

A plurality of operating stations, each with a similar base unit, 36', may be provided, rather than just a single one, each connected to a multiplexer, 84. Several of these are shown in FIG. 6 interconnected to multiplexer 84 by a corresponding pair of interconnections, 38' and 40'. Multiplexer 84 is connected to a somewhat modified remote reading station, 86, by a corresponding pair of interconnections, 88 and 90. A first display, 92, is provided in remote reading station 86 for indicating which of base units 36' is being read, and a second display, 94, is also provided in station 86 for displaying the information transmitted by that operating station base unit 36'.

The plurality of operating stations shown in FIG. 6, described above, is suitable for use in an apartment building when the thermostat setting of each of a plurality of apartments is to be monitored. Remote reading station 86 and multiplexers 84 sequentially interrogate each of the operating station base units 36' by supplying the voltage waveform of FIG. 5A in sequence to each the operating station base units 36' on its corresponding pair of interconnections 38' and 40'. In accord, corresponding information from each of the interrogated operating station base units 36' is sequentially displayed on display 94 of remote reading station 86 concurrently with displaying on display 92 thereof the identity of the base station that is currently being interrogated.

Remote reading station 86 can store information from each operating station for later transmission over a communications network, such as a telephone system, to a remote billing computer. This makes using the information from the operating stations economical to use.

In operation, a conventional thermostat, such as thermostat 12 in FIG. 1, is provided in an environment in which temperature is to be controlled such as an apartment in a building possibly comprised of a number of such apartments. A user at such a site may select a temperature by setting the set point control arm of set point control arm and background dial combination 18 at a desired location along the temperature scale of thermostat 12. Thermostat 12 acts through its temperature sensing mechanism to close switch 20 thereof when the environmental temperature is below the temperature indicated by the setting of control dial 18 and opens switch 20 when the environmental temperature is above the temperature corresponding to the setting on control dial 18. Heating/cooling unit 14 reacts to the opening or closing of switch 20, which opens or completes the circuit for supplying power thereto, by supplying or withdrawing heat from the controlled environment.

A setting of set point control arm and background dial combination 18 may thereafter be read remotely as the temperature commanded by the user in the apartment on display 42 of remote reading station 34 shown in FIG. 2. Remote reading station 34 receives data from base unit 36 at the operating station in the apartment to accomplish this, as will be described below. As the setting of the set point arm of set point arm control and background dial 18 in a thermostat 12 is adjusted, wiper blade 46 of wiper armature 44 mechanically connected thereto follows that motion of the set point control arm This causes wiper contact 51 to be in electrical contact with various combinations of track portions 53, 55, 57, 59, 61 and 63 comprising electrical contact 51 for the Gray code position encoder.

Using the configuration of contacts shown in FIG. 3, a discrete digital Gray code is formed using track portions 53, 55, 57, 59, 61 and 63 for each resolvable position of wiper blade 46 corresponding to a setting of the set point control arm of set point control arm and background dial combination 18. As indicated above, each track portion 53, 55, 57, 59, 61 and 63 forms one bit in a simultaneously presented set of six bits forming a parallel bit set, or simultaneously presented bit set, representing a code symbol containing the information as to the position of wiper armature 44 and so of set point control arm and background dial combination 18. The parallel bit set representation of each code symbol is converted to a series of six bits following one after the other in time to form a serial bit set representation by shift register 65 of FIG. 4. The result is the basis for transmitting this information concerning the setting of the set point control arm of set point control arm and background dial combination 18 to remote reading station 34 over interconnections 38 and 40 by correspondingly changing the current drawn over interconnections 38 and 40 or 38' and 40'.

Figure 5:
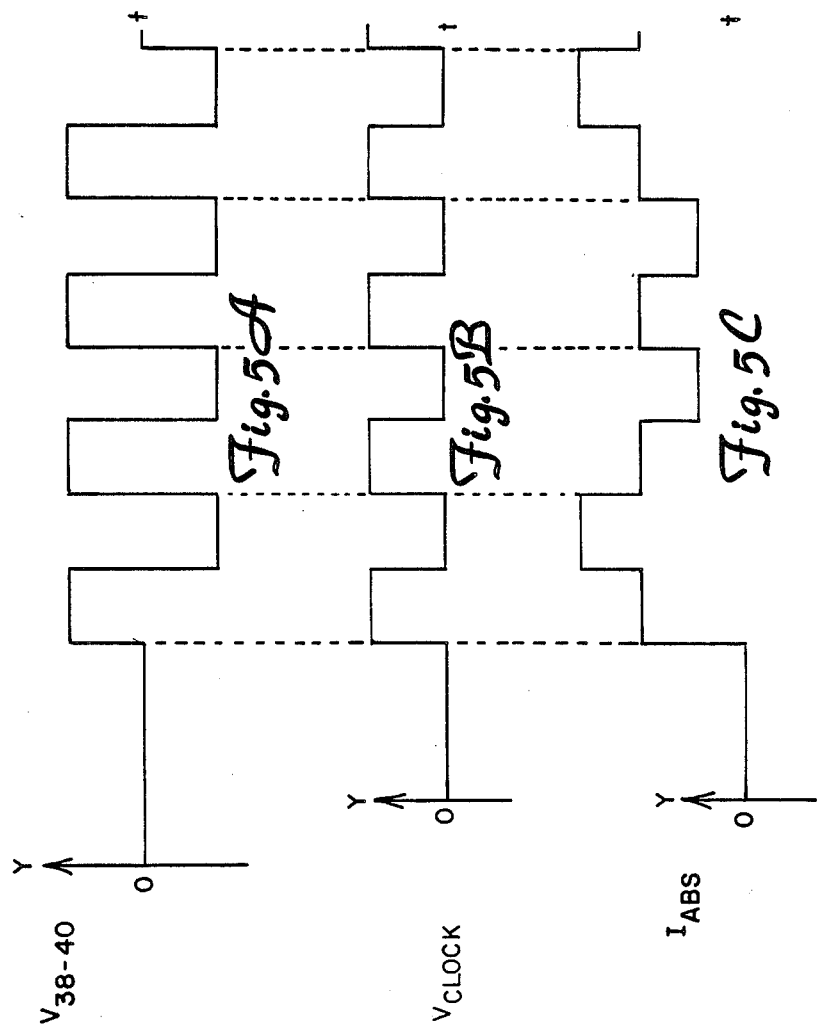
FIGS. 5A, 5B and 5C show circuit waveforms occurring during the use of the present invention.

Base unit 36 or 36' of an operating station receives, as indicated above, electrical power from a remote reading station 34 or 86 on interconnections 38 and 40 or 38' and 40' also, the voltage being provided between interconnections 38 and 40 being generally in the range of from 8 to 12 volts peak-to-peak with an alternating polarity waveform. FIG. 5A is a plot of the voltage supplied by remote reading station 34 on interconnections 38 and 40 versus time and so appearing between terminals 58 and 60. This alternating polarity square waveform has a frequency which provides a timing basis, as indicated above, that can be extracted by use of diode 64 in FIG. 4, as described above, to generate a clock signal at the anode of diode 64 and shown in FIG. 5B. This clock signal is used at operating station base unit 36 in transmitting the series bit set for each code symbol corresponding to a temperature setting as serial digital data as indicated above.

This is done by having the serial digital data transmitted over interconnections 38 and 40 through varying the amount of current drawn by an operating station base unit 36 during one-half of the period of a clock cycle as described above and shown in FIG. 5C when the clock signal of FIG. 5B is low. FIG. 5C shows a plot of the absolute value of the current drawn through interconnections 38 and 40 over a time in which serial data concerning a temperature setting is being transmitted. A constant current is drawn during an initial portion of each clock cycle as a reference current which is shown in FIG. 5C occurring during a clock cycle initial high voltage state as shown in FIG. 5B. This reference current is substantially the current drawn by the output of NAND gate 69 alone in FIG. 4. An increase in the amount of current drawn measured from that reference current level in a subsequent half cycle indicates a logic state denoted by the value "1" and occurs because both NAND gates 67 and 69 of FIG. 4 draw significant currents for a high state at the output of shift register 65 as described above. A decrease in the amount of current drawn as compared to that reference current level indicates a logic state denoted by the value "0" and is due to a low state at the output of shift register 65 preventing any significant currents being drawn by the NAND gates of FIG. 4. Thus, FIG. 5C represents successive logic states of values 1,0,0,1.

Figure 7:
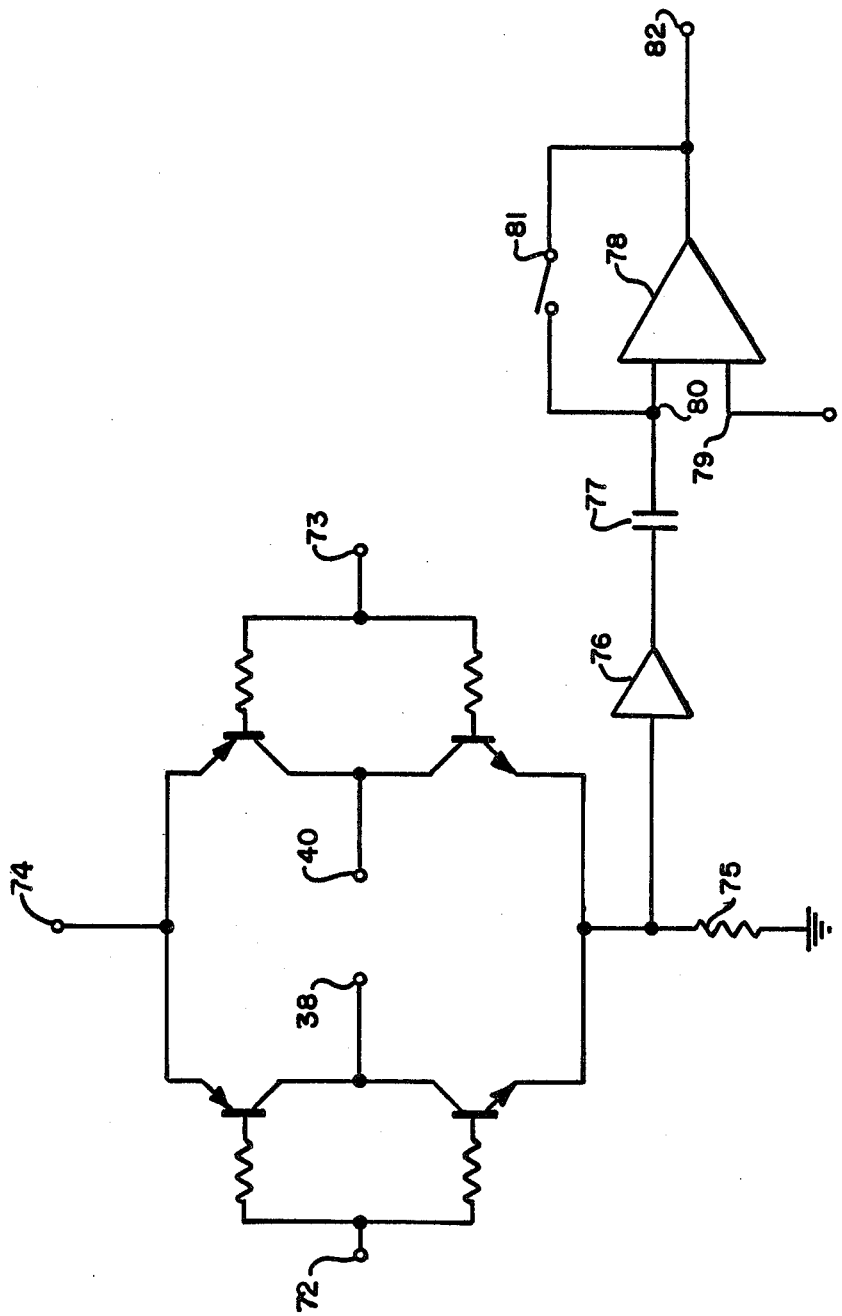
FIG. 7 shows a schematic diagram of a portion of the present invention in FIG. 2.

FIG. 7 shows a basic circuit of the kind that can be used at remote reading station 34 to apply voltage to interconnections 38 and 40 for operating station base unit 36 and to sense the current drawn thereby. Complementary logic drive signals are applied at inputs 72 and 73 of the complemnntary bipolar transistor bridge drive circuit on the left of FIG. 7. These signals in one state will switch on one pnp transistor and the npn transistor on the opposite leg leaving the others off. The opposite state in these drive signals provides the opposite result for these transistors. Thus, voltage from a terminal, 74, is applied to interconnections 38 and 40 with 38 being at a voltage higher than 40 in one drive signal state and at a lower voltage in the other drive signal state to thereby provide the waveform of FIG. 5A. In either situation, the current flowing through interconnections 38 and 40 flows through a resistor, 75, connecting the bridge circuit to ground so that the absolute value of this current as shown in FIG. 5C flows through this resistor. The voltage drop thereacross due to this current flow is an indicator thereof. The clock for the drive logic signals on inputs 72 and 73 sets the clock timing for the voltages on interconnections 38 and 40 and so for base unit 36 at the operating station.

This voltage across resistor 75 is amplified by an amplifier, 76. The result is passed through a capacitor, 77, to a clocked comparator, or sampled data comparator, arrangement to detect voltage changes from the reference (same as drawn current changes from reference current) in a second succeeding half clock cycle. Alternatively, an analog-to-digital converter could be used. A high gain amplifier, 78, stable in a unity gain configuration is used with its non-inverting input, 79, connected to a bias voltage of about half the voltage of the amplifier output range, and with its inverting input, 80, connected to capacitor 77. A switch, 81, connects the amplifier output, 82, to inverting input 80.

Closing switch 81 during one half of the clock cycle causes input 80 and output 82 to go to the bias voltage on input 79 so that the difference between the bias voltage and the reference voltage at the output of amplifier 76 is stored on capacitor 77. Opening switch 81 in the next clock half cycle allows the amplifier 76 output voltage in that half cycle to force the amplifier 78 output 82 low if it is greater than the reference voltage in the previous clock half cycle, but forces this output high if the amplifier 76 output voltage in the second clock half cycle is lower than the reference voltage. Thus, the logic state indicated by the current drawn on interconnections 38 and 40 can be determined at output 82 of amplifier 78.

After a remote reading station 34 inquiry is made by supplying power to the operating station base unit 36 to permit serial data to be transmitted, but before another transmission of such data is needed, the voltage across interconnections 38 and 40 shown in timing diagram 78 may be reduced to zero, to thereby terminate operation of the operating station base unit 36 and reduce the current drawn by that base unit through interconnections 38 and 40 to zero as shown in FIG. 5C before such a transmission. This prolongs the life span of the electrical components used in operating station base units 36, and minimizes electrical cost.

The present system is capable of transmitting additional information other than the settings of a thermostat set point control arm, such additional information also being sensed. This additional information may include diagnostic information, power use, etc. Such information may be obtained by suitable means and provided in the form of digital bits which can then be included with the series of bits in the serial digital information transmission described above.

Although the present invention has been described with reference to preferred embodiments, workers skilled in the art will recognize that changes may be made in form and detail without departing from the spirit and scope of the invention.

What is claimed is:

1. An information transmission system for acquiring information and transmitting same from an operating station to a collection station using electrical power supplied from said collection station, said system comprising:
   a current transmitting detector means capable of applying voltages across a pair of transmission interconnections each electrically connected at one end thereof to said current transmitting detector means, and further capable of providing a resulting line current therethrough to that extent permitted by that value of electrical impedance effectively occurring across said pair of transmission interconnections at an opposite end thereof, said current transmitting detection means having therein a current detection means capable of determining whether said line current has a value greater or less than a selected value based on differences in values therebetween;
   a data gathering means for acquiring information desired to be transmitted, said data gathering means having an output on which is provided an output signal containing a representation of such information as has been acquired; and
   a current modulator means for electrical connection to said opposite end of said pair of transmission interconnections, said current modulation means being electrically connected to said output of said data gathering means, said current modulator means having a selectively adjustable value electrical impedance therein for electrical connection between said pair of transmission interconnections, said current modulator means being capable of changing values of effective electrical impedance of said adjustable value electrical impedance to values above or below a selected impedance value, capable of yielding said selected value of line current, in response to said data gathering means output signal.

2. The apparatus of claim 1 wherein said current transmitting detector means is capable of applying a voltage across said pair of transmission interconnections, as aforesaid, which varies between greater and lesser values, and said current modulator means changes electrical impedance values of said adjustable value electrical impedance means, as aforesaid, in selected portions of said variation of said voltage applied by said current transmitting detector means.

3. The apparatus of claim 1 wherein said data gathering means comprises a coding means attached to a desired temperature setting means of a thermostat so that a selected temperature setting thereof can be represented by a code symbol at said data gathering means output.

4. The apparatus of claim 1 wherein there is a plurality of current modulator means each connected alternatively across a pair of transmission interconnections to said current transmitting detector means by a multiplexing means.

5. The apparatus of claim 2 wherein said current modulator means has a control logic means having a clock signal provided to an input thereof which clock signal is based on times of occurrences of said variations of said voltage applied by said current transmitting detector means.

6. The apparatus of claim 3 wherein said coding means comprises a position encoder means directly attached to said thermostat desired temperature setting means, and a shift register means connected to receive signals from said position encoder means.

7. The apparatus of claim 5 wherein said data gathering means comprises a coding means cooperating with a desired temperature setting means of a thermostat so that a selected temperature setting thereof can be represented by a code symbol at said data gathering mean output.

8. The apparatus of claim 7 wherein said coding means comprises a shift register means which has said clock signal provided to an input thereof.

9. The apparatus of claim 8 wherein said coding means comprises a position encoder means directly attached to said desired thermostat temperature setting means, and said shift register means is connected to receive signals from said position encoder means.

10. The apparatus of claim 8 wherein said shift register means provides an output signal to an input of said control logic means which substantially controls, by selectively drawing current therethrough, that current drawn by said current modulator means.

11. A method for transmitting information acquired at an operating station over a pair of transmission interconnectors to a collection station, said method comprising:

applying a voltage changing between values during change portions thereof across said pair of transmission interconnections at said collection station;

changing electrical impedance provided across said transmission interconnections in said operating station to cause current flowing in said transmission interconnections to alternate between a selected current value during a part of said change portions and values above or below said selected current value during another part of said change portions in accord with a representation of that information desired to be transmitted; and detecting said selected value and said values above and below said selected value of current flowing in said pair of transmission interconnections at said collection station during said change portions.

* * * * *